April 19, 1949.   C. G. HAWKINS   2,467,381
CONTROL SYSTEM
Filed May 28, 1946
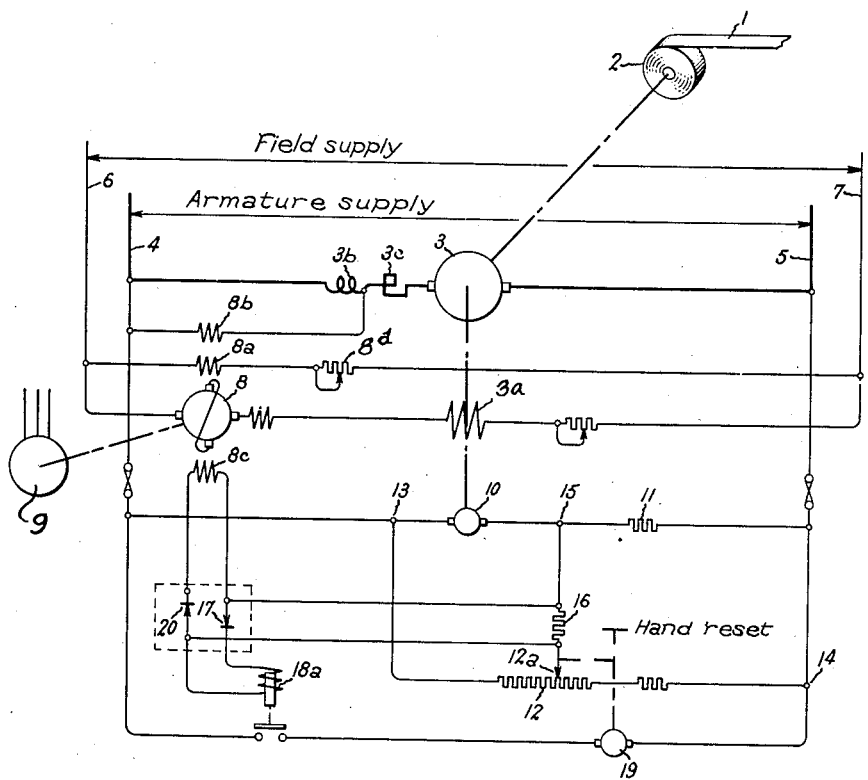
Inventor:
Cyril G. Hawkins,
by Claude H. Mott
His Attorney.

Patented Apr. 19, 1949

2,467,381

UNITED STATES PATENT OFFICE 2,467,381

CONTROL SYSTEM

Cyril G. Hawkins, Manchester, England, assignor, by mesne assignments, to General Electric Company, a corporation of New York Application May 28, 1946, Serial No. 672,743
In Great Britain June 25, 1945

6 Claims. (Cl. 318—355)

This invention relates to control systems, more particularly to systems for controlling the operation of winding a length of material on a reel to form a coil, and an object of the invention is the provision of a simple, reliable and improved control system of this character. More particularly, the invention relates to control systems for winding equipment of the kind in which the winding reel is rotated by an electric motor having associated speed control means effective automatically to decrease the rotational speed of the reel with increase in the diameter of the coil in such manner that the linear speed of the material, and thus the tension in the web remain constant. The invention is particularly applicable with respect to a winding reel forming part of an installation with sectional drive operating on the material in a continuous process and whereof the different sections are positively driven by individual motors, so that the tension in the material arriving at the winding reel is provided by the relative speed of the reel to that of the previous section; with the linear speed of the section preceding the winding reel and that of the winding reel maintained constant, the tension in the material is also maintained constant.

In winding equipment of the kind referred to as heretofore provided, it is characteristic of the arrangements for maintaining constant linear speed and tension in the material, that, in the event of a breakage or other occurrence resulting in appreciable reduction of tension in the material, the associated speed control means tends abruptly to accelerate the winding reel in an effort to restore the tension to the normal value.

The invention provides an improved equipment of the kind referred to, incorporating means for ensuring that, notwithstanding the ability of the speed control means to maintain substantially constant the linear speed of, and tension in, the material, the rotational winding speed is maintained substantially unaltered in response to breakage of the material or equivalent occurrence involving appreciable reduction in the tension thereof from the normally maintained constant value.

In winding equipment of this invention, the winding reel is rotated by a direct current motor having a constant supply voltage whilst its excitation is supplied, at least in part, by an amplidyne exciter, or other suitable direct current machine of the armature-reaction excitation type, having a substantially constant component of control excitation and an opposing component of control excitation which is variable proportionately with the current in the armature circuit of the winding reel driving motor, in such manner that, as the radius of winding increases, the effective control excitation of the amplidyne exciter is automatically reduced and the excitation of the winding reel motor correspondingly adjusted so as to reduce the speed of the winding reel motor for maintaining substantially constant linear speed of, and tension in, the material. In addition, provision is made for detecting increase of speed of the winding reel motor, such for instance as in consequence of breakage of the material or equivalent occurrence involving appreciable reduction of tension in the material, and for utilizing such detection in the adjustment of the excitation of the winding reel motor for restoring the rotational speed of said motor substantially to the value obtaining immediately prior to the increase of speed aforesaid.

In practicing the invention the amplidyne or equivalent exciter may have its control excitation provided as to one component by a (reference) field winding energized from constant voltage supply and as to the other and opposing component by a (variator) field winding energized by the voltage drop across a resistor included in the armature circuit of the winding reel motor, or equivalently across the whole or part of the series field winding with which the winding reel motor is provided. The amplidyne exciter may conveniently be connected in series with a field winding of the winding reel motor across a supply at substantially constant voltage supply and preferably independent of the supply for the winding reel motor.

In the detection of increase of speed of the winding reel motor, use may be made of the feature that, during normal operation, namely, so long as tension is maintained in the material being wound, the action of the metadyne or equivalent exciter is to cause the speed of the winding motor to fall progressively as the radius of winding increases, whereas increase of speed of the winding reel motor represents an abnormal condition. For the purpose of detecting an increase in the speed of the winding reel motor a Wheatstone resistance bridge is provided which is arranged to be maintained in balance as long as the speed of the winding reel motor is at a normal value or is progressively falling, but becomes unbalanced in response to increase in the speed of said motor. Adjustment of the excitation of the winding reel motor to restore the rotational speed of the winding reel motor following unbalance of the bridge may be effected in any suitable manner, for example, by controlling the excitation of the amplidyne.

For a better and more complete understanding of the invention, reference should now be had to the following specification and to the accompanying drawing, the single figure of which is a simple, schematic diagram of an embodiment of the invention.

Referring now to the drawing, a length of material 1, such as a strip of cold steel, or web of paper is being wound upon a reel 2 which is driven by suitable driving means, such as an electric motor 3. This motor is preferably a direct current motor and is provided with a shunt field winding 3a, a series field winding 3b, and a compensating field winding 3c. The armature of the motor is supplied from a suitable, direct voltage source of supply which is represented by the two supply lines 4 and 5. Also the shunt field winding 3a is supplied from a suitable source of excitation which is represented by the two supply lines 6 and 7. A component of excitation for the shunt field winding is provided by means of a suitable exciter 8 which is preferably an amplidyne. The armature of the amplidyne is connected in series with the shunt field winding 3a of the motor. The amplidyne is driven at a speed which is preferably substantially constant by suitable means such as an induction motor 9.

As shown, the amplidyne 8 is provided with a reference field winding 8a which is excited from the source 6—7 and is also provided with an opposing field winding 8b which is excited in accordance with the armature current of the winding reel motor. For this purpose the field winding 8b is connected across a suitable voltage drop device in the armature circuit of the reel motor, such as the series field winding 3b. If the armature current of the motor tends to decrease below a desired value which is predetermined by the setting of rheostat 8d, the excitation of field winding 8b is correspondingly weakened. This increases the net excitation of the amplidyne, thereby increasing the bucking action and weakening the field of the reel motor. In response to this field weakening the speed of the reel motor and the armature current are correspondingly increased until the armature current is restored approximately to its original value. Similarly, if the armature current tends to increase above the predetermined value, the reverse action takes place and the balanced condition is reestablished. Thus, the amplidyne acts as a regulator to maintain the armature current of the winding reel motor substantially constant.

As the winding operation progresses and the coil diameter increases, the field of the motor is progressively strengthened. Since the armature current is held constant, the torque of the motor is increased in correspondence to the increase in coil diameter. The tension in the strip remains constant since its moment arm, which is equal to the radius of the coil, increases to balance the increased torque of the motor.

The armature of a tachometer generator 10 which is mechanically coupled to the winding reel motor is connected in one arm of a Wheatstone resistance bridge network having another arm constituted by a resistance 11 of fixed value whilst the ratio arms are constituted by the portions of the resistances on opposite sides of the slider 12a of a motor-operated resistance potentiometer 12. One pair of conjugate points 13 and 14 of the bridge is connected to a substantially constant voltage supply, whilst across the other, or output, pair of conjugate points 15 and 12a is connected a resistor 16. This output resistor 16 is included in circuit with a rectifier 17, or alternatively a unidirectional amplifier, for energizing the operating coil 18a or equivalent operating element of an electro-responsive relay device 18 which controls the operation of the motor 19 which drives the potentiometer slider 12a. The output resistor 16 is also included in an alternative circuit with a rectifier 20, or unidirectional amplifier, of opposite sense to the rectifier 17, for energizing a field winding 8c of the amplidyne or exciter. This field winding when energized acts to increase the excitation of the winding reel driving motor. During normal operation with the electromotive force of the tachometer generator falling progressively as the diameter of the coil increases, the bridge is maintained substantially in balance since any out-of-balance is manifest by a potential difference across the output resistor 16, causing operation of the relay 18 and in turn controlling the potentiometer motor to adjust the potentiometer so as to restore the condition of balance. In the event of a breakage of the strip, the regulating action of the system tends to increase the speed of the motor to build up tension. Since tension cannot be built up, this acceleration tends to proceed to the limit. However, the resulting increase in speed of the tachometer generator and the resulting increase in its voltage act to upset the balance in the bridge. The resulting voltage across the output resistor 16 of the bridge, which is in opposite sense to that under normal operation, does not effect operation of the relay. On the contrary, it acts through the rectifier 20 and amplidyne to cause increase in the excitation of the winding reel motor. This field strengthening is effected to an amount which depends upon the condition of the bridge potentiometer immediately prior to the condition of unbalance of the bridge.

Conveniently manually-operable or other means may be provided for enabling restoration of balance in the bridge when, for example, replacement of the winding reel is being effected.

A special advantage of the arrangement is that, with the winding reel motor having a field winding energized from a source of supply which is independent of the supply to its armature, so that the speed of the winding reel motor is directly related to armature voltage for a given value of excitation, the operation is substantially unaffected by variation of the supply voltage to the winding reel motor as may be effected, for instance, in adjusting the speed setting of the winding motor.

What I claim as new and desire to secure by Letters Patent of the United States, is:

1. A control system for an electric motor subject to a load of progressively increasing torque comprising regulating means responsive to the armature current for varying the excitation of the motor to maintain the power input to the motor substantially constant, and means responsive to an increase in the speed of said motor for counteracting the action of said regulating means and strengthening the excitation of the motor to maintain the speed of the motor substantially constant at approximately the speed existing at the instant of said increase.

2. A control system for a first electric motor subject to a load of progressively increasing torque comprising regulating means responsive to the armature current for varying the excitation of the motor to maintain the power input to the motor substantially constant, means responsive to an increase in the speed of said motor for counteracting the action of said regulating means and strengthening the excitation of the motor to maintain the speed of the motor substantially constant at approximately the speed existing at the instant of said increase in speed, comprising a Wheatstone bridge having a tachometer generator driven by said first motor and a voltage drop device as first and second arms and a rheostat provided with a slider and the portions of said rheostat on opposite sides of said slider constituting the ratio arms, an electric motor for driving said slider, means responsive to an unbalance of said bridge resulting from a decrease in the speed of said first motor for energizing said second motor to rebalance said bridge, and means responsive to an unbalance of said bridge resulting from an increase in the speed of said first motor for strengthening the excitation of said first motor.

3. A control system for a first electric motor which is subjected to a load of progressively increasing torque comprising regulating means responsive to the armature current for varying the excitation of the motor to maintain the power input to the motor subsantially constant, a bridge network comprising a tachometer generator driven by said motor and a voltage drop device constituting the first and second arms and a rheostat having a slider, and the portions on opposite sides of the slider constituting the ratio arms, a second electric motor for driving said slider, means responsive to an unbalance of said bridge resulting from a decrease in the speed of said first motor for energizing said second motor to move said slider to rebalance said bridge, and means responsive to an unbalance of said bridge resulting from an increase in the speed of said first motor for strengthening the excitation of said first motor to counteract the action of said regulating means and limit the speed to approximately the value existing at the instant of said increase.

4. A control system for a first electric motor which is subjected to a load of progressively increasing torque comprising regulating means responsive to the armature current for varying the excitation of the motor to maintain the power input to the motor substantially constant, a bridge network comprising a tachometer generator driven by said motor and a voltage drop device constituting the first and second arms and a rheostat having a slider, and the portions on opposite sides of the slider constituting the ratio arms, a second electric motor for driving said slider, means responsive to an unbalance of said bridge resulting from a decrease in the speed of said first motor for energizing said second motor to drive said slider to rebalance said bridge, and means responsive to an unbalance of said bridge resulting from an increase in the speed of said first motor for strengthening the excitation thereof to counteract the action of said regulating means and limit the speed of said first motor approximately to the speed existing at the instant of said increase.

5. A control system comprising in combination a motor which is subject to a load of progressively increasing torque and provided with a field winding, an exciter dynamoelectric machine connected in circuit with said field winding and excited in response to the armature current of said motor for varying the excitation of said field winding to maintain the power input to said motor substantially constant, a Wheatstone bridge network comprising a tachometer generator driven by said motor and a voltage drop device constituting first and second arms of said bridge, and a rheostat having a slider, the portions of said rheostat on opposite sides of said slider constituting the ratio arms of said bridge, a second electric motor for driving said slider, an electromagnetic switching device having its operating coil connected across the conjugate points of said bridge for responding to an unbalance of said bridge resulting from a decrease in the speed of said first motor to energize said second motor to move said slider to rebalance said bridge, and connections across said conjugate bridge points for furnishing a component of excitation to said dynamo electric machine in response to an unbalance of said bridge resulting from an increase in the speed of said first motor for varying the excitation of said motor to limit the speed of said motor approximately to the speed existing at the instant of said increase.

6. A control system comprising in combination a motor which is subject to a load of progressively increasing torque and provided with a field winding, an exciter dynamoelectric machine connected in circuit with said field winding and excited in response to the armature current of said motor for varying the excitation of said field winding to maintain the power input to said motor substantially constant, a Wheatstone bridge network comprising a tachometer generator driven by said motor and a voltage drop device constituting first and second arms of said bridge, and a rheostat having a slider, the portions of said rheostat on opposite sides of said slider constituting the ratio arms of said bridge, a second electric motor for driving said slider, an electromagnetic switching device having its operating coil connected across the conjugate points of said bridge for responding to an unbalance of said bridge resulting from a decrease in the speed of said first motor to energize said second motor to move said slider to rebalance said bridge, connections across said conjugate bridge points for furnishing a component of excitation to said dynamoelectric machine in response to an unbalance of said bridge resulting from an increase in the speed of said first motor for varying the excitation of said motor to limit the speed of said motor approximately to the speed existing at the instant of said increase, a unidirectional conducting device in circuit with said operating coil for preventing energization of said coil in response to an unbalance of the bridge resulting from an increase in the speed of said first motor and a second unidirectional conducting device included in said connections for preventing response of said dynamoelectric machine to an unbalance of said bridge resulting from a decrease in speed of said first motor.

CYRIL G. HAWKINS.

REFERENCES CITED

The following references are of record in the file of this patent:

UNITED STATES PATENTS

| Number | Name | Date |
| --- | --- | --- |
| 2,305,937 | Montgomery | Dec. 22, 1942 |